US006344729B1

(12) United States Patent
Chiang

(10) Patent No.: US 6,344,729 B1
(45) Date of Patent: Feb. 5, 2002

(54) METHOD AND APPARATUS FOR RECONDITIONING AND CHARGING A BATTERY

(75) Inventor: Tai-An Chiang, Taipei (TW)

(73) Assignee: Tachiang Technology Corp., Taipei (TW)

( * ) Notice: Subject to any disclaimer, the term of this patent is extended or adjusted under 35 U.S.C. 154(b) by 0 days.

(21) Appl. No.: 09/693,081

(22) Filed: Oct. 20, 2000

(51) Int. Cl.⁷ ............................................... H01M 10/46
(52) U.S. Cl. ....................................................... 320/131
(58) Field of Search ............................... 320/127, 128, 320/129, 131, 139, 141, 145

(56) References Cited

U.S. PATENT DOCUMENTS 4,376,263 A * 3/1983 Pittroff et al.
5,998,968 A * 12/1999 Pittman et al. ............. 320/130

* cited by examiner

Primary Examiner—Edward H. Tso
(74) Attorney, Agent, or Firm—Jiawei Huang; J. C. Patents

(57) ABSTRACT

A method and apparatus for reconditioning and charging a battery is disclosed. The lead-acid battery rejuvenator apparatus comprises of an oscillator, a frequency divider and a pair of transistors. The oscillator outputs a frequency signal. The frequency divider receives the frequency signal and splits the frequency signal into a plurality of non-overlapping operating frequency signals. These operating frequency signals are sent to respective operating frequency output terminals. The three terminals of a first transistor are electrically connected to one terminal of an inductor, the negative terminal of the lead-acid battery and one of the operating frequency output terminals. The other terminal of the inductor is electrically connected to the negative terminal of the lead-acid battery. The three terminals of a second transistor are electrically connected to one terminal of a resistor, the negative terminal of the lead-acid battery and another operating frequency output terminal. The other terminal of the resistor is electrically connected to the positive terminal of the lead-acid battery.

6 Claims, 1 Drawing Sheet

METHOD AND APPARATUS FOR RECONDITIONING AND CHARGING A BATTERY

BACKGROUND OF THE INVENTION

1. Field of Invention

The present invention relates to a method and apparatus for reconditioning and charging a battery. More particularly, the present invention relates to a lead-acid battery rejuvenator and a method for operating the same.

2. Description of Related Art

During a battery discharge process, ions within the battery electrolyte will be attracted towards the electrode plate, for example, lead or lead oxide electrode plate, to form a lead acid compound. Over repeated use, usually these aforementioned lead acid compounds gradually build up and are deposited as stacked layers over the electrode plate. When these stacked layers reach a certain level at which the chemistry of the battery solution is altered, this may in turn prevent the exchange of ions, thereby increasing resistance of the battery. Therefore, the accumulation of lead acid compound due to repeated use results in a gradual increase in the internal resistance of the battery and loss of efficiency. Although electric power within the lead-acid battery can be somewhat restored after passing a direct current through the battery during a recharging step, the direct current is too weak to eliminate the lead-acid compound which are deposited on the electrode plate. In fact, the adhesion force between the lead-acid compound and the electrode plate is further increased over repeated battery recharging/ discharging cycles. Hence, each battery discharge not only deposits more lead-acid compound on the lead plate, but also converts a portion of the lead-acid compound into harder-to-remove lead-acid crystals.

To tackle the aforementioned lead-acid accumulation problem, Gali et al in U.S. Pat. No. 4,871,959, U.S. Pat. No. 5,063,341, U.S. Pat. No. 5,084,664 and Gregory et al in U.S. Pat. No. 5,491,399 has proposed a lead-acid battery rejuvenator. According to their inventions, each lead-acid battery rejuvenator employs a transformer with a capability to generate periodic oscillatory pulses connected to the battery electrodes for recharging the battery. According to them, this would facilitate gradual peeling-off of the lead-acid compound stacked layers on the electrode. The peeled off lead-acid compound is re-dissolved into the battery solution or deposited at the bottom section of the battery.

However, since the aforementioned battery rejuvenators have a circuit structure that depends on a transformer to produce the necessary periodic oscillatory pulses, therefore, the highest frequency of the oscillatory pulses produced is limited by the frequency of the transformer, which is at the most 8 KHz. Since the applied frequency of the pulses arc relatively low therefore the rate of removal is quite slow and less efficient in overcoming the aforementioned problems.

Accordingly, in order to improve the removal rate of lead-acid compound stacked layers from the electrodes, it is highly desirable to use periodic pulses of much higher frequencies. Hence, an ideal battery rejuvenator should be easy to operate and capable of effectively and efficiently remove the lead-acid compound that arc formed on the electrodes which is both time and cost effective.

SUMMARY OF THE INVENTION

Accordingly, the present invention provides a battery rejuvenator having an oscillator, a frequency divider and two transistors for rapid dissociation of lead-acid compound on the electrode of a lead-acid battery.

The present invention provides a method of dissociating the lead-acid crystals adhered to the electrode of a lead-acid battery.

The present invention provides a process for decreasing the adhesion force between lead-acid crystals and the electrode of the battery.

The present invention provides a battery rejuvenator apparatus and a method for generating a pulse frequency which is much higher than that generated by the conventional techniques so that the lead-acid compound on an electrode can be effectively dissociated.

The present invention provides a method of reconditioning and recharging a lead-acid battery by using a rapid periodic pulse signals generated form an A/C power source.

More specifically the present invention provides a battery rejuvenator comprising an oscillator for generating oscillating output frequency signals. A frequency divider capable of generating a plurality of non-overlapping pulse frequency output signals upon receiving the frequency signal from the oscillator through respective operating frequency out-put terminals. A first transistor, wherein the load terminal of the first transistor is electrically connected to one terminal of an inductor while the other terminal of the inductor is electrically connected to the positive terminal of a lead-acid battery, the ground terminal of the first transistor is electrically connected to the negative terminal of the lead-acid battery, and the control terminal of the first transistor is electrically connected to one of the operating frequency output terminals of the frequency divider. And a second transistor, wherein the load terminal of the first transistor is electrically connected to one terminal of a resistor while the other terminal of the resistor is electrically connected to the positive terminal of the lead-acid battery, the ground terminal of the second transistor is electrically connected to the negative terminal of the lead-acid battery, and the control terminal of the second transistor is electrically connected to one of the operating frequency output terminals of the frequency divider.

It is to be understood that both the foregoing general description and the following detailed description are exemplary, and arc intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
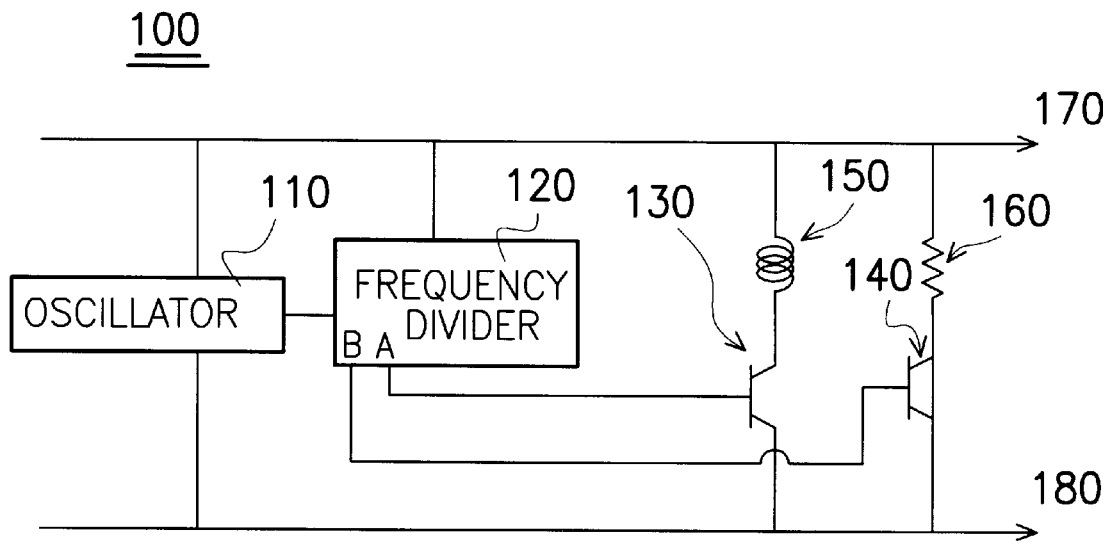
FIG. 1 is a schematic block diagram showing the circuit system of a lead-acid battery rejuvenator according to one preferred embodiment of this invention.

Reference will now be made in detail to the preferred embodiments of the present invention, examples of which are illustrated in the accompanying drawings. Wherever possible, the same reference numbers are used in the drawings and the description to refer to the same or like parts.

FIG. 1 is a schematic block diagram showing the circuit system of a lead-acid battery rejuvenator according to one of the preferred embodiment of the present invention. The present invention provides a lead-acid battery rejuvenator 100 having an oscillator 110, a frequency divider 120, a first transistor 130 and a second transistor 140. The oscillator 110 is capable of generating an oscillating frequency output signal. The frequency divider 120 has a plurality of operating frequency output terminals. Furthermore, the frequency divider 120 capable of receiving a frequency signal from the oscillator 110 and is capable of dividing the frequency signal into a plurality of operating frequencies. These operating frequencies are being output through the respective operating frequency output terminals. The first terminal, the second terminal and third terminal of the first transistor 130 are electrically connected to one end of an inductor 150, and the negative terminal 180 of the lead-acid battery and the operating frequency output terminal A respectively. The other end of the inductor 150 is electrically coupled with the positive terminal of the lead-acid battery. The first terminal, the second terminal and the third terminal of the second transistor 140 are electrically connected to one terminal of a resistor 160, the negative terminal 180 of the lead-acid battery and a second operating frequency output terminal B respectively. The other terminal of the resistor 160 is electrically connected to the positive terminal 170 of the lead-acid battery.

In a first preferred embodiment of the present invention as shown in FIG. 1, the oscillator 110 generates a oscillating frequency signal and transmits it to the frequency divider 120. The frequency divider 120 has a plurality of operating frequency output terminals such as A and B. The frequency divider 120 divides the input frequency signal into a plurality of non-overlapping operating frequencies, which are transmitted to each of the operating frequency output terminals (such as A and B).

In addition, the first terminal, the second terminal and the third terminal of the first transistor 130 are electrically coupled with one of terminal of an inductor 150, the negative terminal 180 of a lead-acid battery, and the operating frequency output terminal A respectively. The other terminal of the inductor 150 is electrically connected to the positive terminal 170 of the lead-acid battery. The first terminal, the second terminal and the third terminal of the second transistor 140 are electrically connected to one terminal of a resistor 160, the negative terminal 180 of the lead-acid battery and another operating frequency output terminal B respectively. The other terminal of the resistor 160 is electrically connected to the positive terminal 170 of the lead-acid battery.

Although transistors 130 and 140 shown in FIG. 1 are drawn as bipolar transistors, other electronic devices may be used. In other words, any devices having a function similar to a bipolar transistor may be used. For example, metal-oxide-semiconductor (MOS) transistors may be used in this invention.

Figure 2:
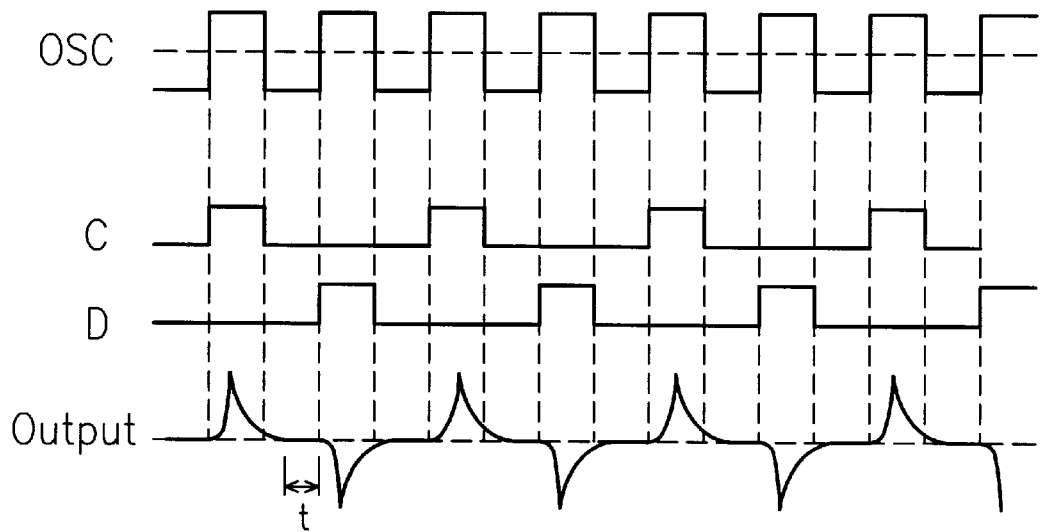
FIG. 2 is a diagram showing the oscillating pulse generated by the circuit system of the lead-acid battery rejuvenator shown in FIG. 1, in accordance with a preferred embodiment of the present invention.

FIG. 2 is a diagram showing the oscillating pulse frequencies generated by the circuit system of the lead-acid battery rejuvenator shown in FIG. 1. The oscillating pulse frequencies produced by the oscillator 110 is labeled as OSC, as shown in FIG. 2. The frequency divider 120 separates the OSC into two non-overlapping operating frequencies having oscillating pulses C and D respectively. The oscillating pulse C is fed to the operating frequency output terminal A while the oscillating pulse D is fed to the operating frequency output terminal B. Note that although the oscillating pulses C and D have no overlapping anywhere, absolute non-overlapping is not a main criterion for operating the rejuvenator. A design with a portion of the pulse overlapping is also used to practice the present invention.

When oscillating pulse C is passed through the operating frequency output terminal to the first transistor 130, the first transistor 130 is switched on and off according to the oscillating pulse C. Similarly, the second transistor 140 is also switched on and off according to the oscillating pulse D. Through the oscillating pulse signals that are transmitted to the first and the second transistors 130 and 140, an output oscillating pulse labeled Output in FIG. 2 is generated between the positive terminal 170 and the negative terminal 180 of the lead-acid battery (according to the rejuvenator circuit shown in FIG. 1). The oscillating pulse output signal as shown in FIG. 2 has a time period t that separate a successive pulse from a preceding pulse. This ensures the independent switching of the first and the second transistors 130 and 140 and prevents the flow of an excessive current through the circuit devices.

The lead-acid compound has a structure with the lead ion in the central region and sulfuric acid or sulfurous acid radicals around the outer region. The frequency divider 120 provided in the aforementioned embodiment can be set to operate at a frequency between 500 to 700 KHz for effective and efficient removal of lead-acid crystal from the electrode of a lead-acid battery. For a better utilization of the rejuvenator, the operating frequency can be set even higher than 700 KHz. p In a second embodiment of this invention, a first pulse signal is applied to the frequency divider 120 through the oscillator 110. At a predetermined time interval after the end of the first pulse, for example, half a wave or a full wave, a reverse phase pulse signal is provided. The above process is repeated with a positive phase pulse and a negative phase pulse emitted alternately. Hence, a sequence of alternate phase pulses is applied to the electrode plate of a lead-acid battery.

Application of a sequence of alternate phase high frequency pulses to the electrode plate of a lead-acid battery can effectively facilitate the removal of lead-acid compound adhering to the electrode plate. This is because as the lead ions in a lead-acid compound are heavy and under the influence of the applied high frequency pulse, exert different dipole moments leading the lead ions to align on the side of the electrode plate at a range of angles. This in turn will facilitate the removal and dissociation of lead-acid compound from the surface of the electrode.

Although only two operating frequencies are provided by the frequency divider 120 according to the first and the second embodiment of the present however it is to be understood that the present invention is not restricted to only two operating frequencies, more than two operating frequencies may be used to practice the present invention. In addition, the number of transistors used in the rejuvenator circuit is not restricted to only two, more than two transistors may be used to practice the present invention. It is to be further understood that as the number of transistors used in the rejuvenator circuit is increased, the corresponding number of operating frequency output terminals will also increase. Furthermore, the reason for choosing an operating frequency somewhere between 500 to 700 KHz is to facilitate effective removal of the lead-acid compound from the surface electrode plate so that the reconditioning of the battery can be substantially improved.

In summary, this invention provides an effective and efficient lead-acid battery rejuvenator and an innovative method for removal and dissociation of the lead-acid compound from the surface of a lead-acid battery.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A lead-acid battery rejuvenator, comprising:

an oscillator for outputting a frequency signal;

a frequency divider having a plurality of operating frequency output signal, wherein the frequency divider receives the frequency signal from the oscillator and chops up the input frequency signal into a plurality of non-overlapping operating frequency signals, then the operating frequency signals are distributed to respective operating frequency output terminals;

a first transistor, wherein the load terminal of the first transistor is electrically connected to one terminal of an inductor while the other terminal of the inductor is electrically connected to the positive terminal of the lead-acid battery, the ground terminal of the first transistor is electrically connected to the negative terminal of the lead-acid battery, and the control terminal of the first transistor is electrically connected to one of the operating frequency output terminals of the frequency divider; and a second transistor, wherein the load terminal of the first transistor is electrically connected to one terminal of a resistor while the other terminal of the resistor is electrically connected to the positive terminal of the lead-acid battery, the ground terminal of the second transistor is electrically connected to the negative terminal of the lead-acid battery, and the control terminal of the second transistor is electrically connected to one of the operating frequency output terminals of the frequency divider.

2. The rejuvenator of claim 1, wherein the operating frequency signal is between 500~700 KHz.

3. The rejuvenator of claim 1, wherein the first transistor includes a metal-oxide-semiconductor (MOS) transistor.

4. The rejuvenator of claim 3, wherein the operating frequency signal is between 500~700 KHz.

5. The rejuvenator of claim 1, wherein the second transistor includes a metal-oxide-semiconductor (MOS) transistor.

6. The rejuvenator of claim 5, wherein the operating frequency signal is between 500~700 KHz.

\* \* \* \* \*

UNITED STATES PATENT AND TRADEMARK OFFICE
CERTIFICATE OF CORRECTION

PATENT NO.   : 6,344,729 B1
DATED        : February 5, 2002
INVENTOR(S)  : Tai-An Chiang et al.

It is certified that error appears in the above-identified patent and that said Letters Patent is hereby corrected as shown below:

<u>Title page,</u>
Item [75], Inventor, add -- Arthur Chenghsin Wu -- as the second inventor.

Signed and Sealed this

Thirty-first Day of December, 2002

JAMES E. ROGAN
*Director of the United States Patent and Trademark Office*